United States Patent [19]

Schifferly

[11] Patent Number: 5,074,125
[45] Date of Patent: Dec. 24, 1991

[54] ROTARY MIXER WITH RESINOUS SCRAPER BLADES

[76] Inventor: Richard E. Schifferly, 9717 Waterville-Neapolis Rd., Waterville, Ohio 43566

[21] Appl. No.: 582,363

[22] Filed: Sep. 14, 1990

[51] Int. Cl.⁵ .............................................. A23G 9/12
[52] U.S. Cl. ...................................... 62/342; 366/312
[58] Field of Search ................................ 62/342, 343; 366/311–313

[56] References Cited

U.S. PATENT DOCUMENTS

| | | | |
|---|---|---|---|
| 2,488,668 | 11/1949 | Knibb | 62/342 |
| 2,526,367 | 10/1950 | Kaltenbach et al. | 366/313 X |
| 2,746,730 | 5/1956 | Swenson et al. | 366/311 |
| 2,810,557 | 10/1957 | Phelan | 62/342 X |
| 3,181,840 | 5/1965 | Rietz | 366/311 |
| 3,952,069 | 8/1990 | Boulard | 366/312 |

Primary Examiner—William E. Tapolcai
Attorney, Agent, or Firm—Charles F. Schroeder

[57] ABSTRACT

A rotary mixer scraper blade commonly termed a beater scraper blade for a freezer machine for producing ice cream, frozen yogurt and like confectionery foods in which the mixer has diametrically opposite scraping blades at opposite ends thereof. The scraper blades have a generally triangular cross sectional shape with a thick body portion narrowing to the thin scraping edge thus presenting a leading face of the blade which is presented at an angle which facilitates removal therefrom of material it engages during mixing and scraping thus reducing tendencies toward hangup of material thereon. Since the blades have a cross sectional shape with a thicker section than conventional blades they can be made of resinous material instead of metal because the shape imparts greater flex strength to the blades compared to conventional parallel sided blades. Thus metal to metal contact of the blades with the interior freezer walls is eliminated and the chance of particles of metal getting into the confectionery product produced is correspondingly eliminated resulting in a smoother product while at the same time reducing the operation noise, preventing cylinder scoring, and prolonging the like of the blades.

9 Claims, 2 Drawing Sheets

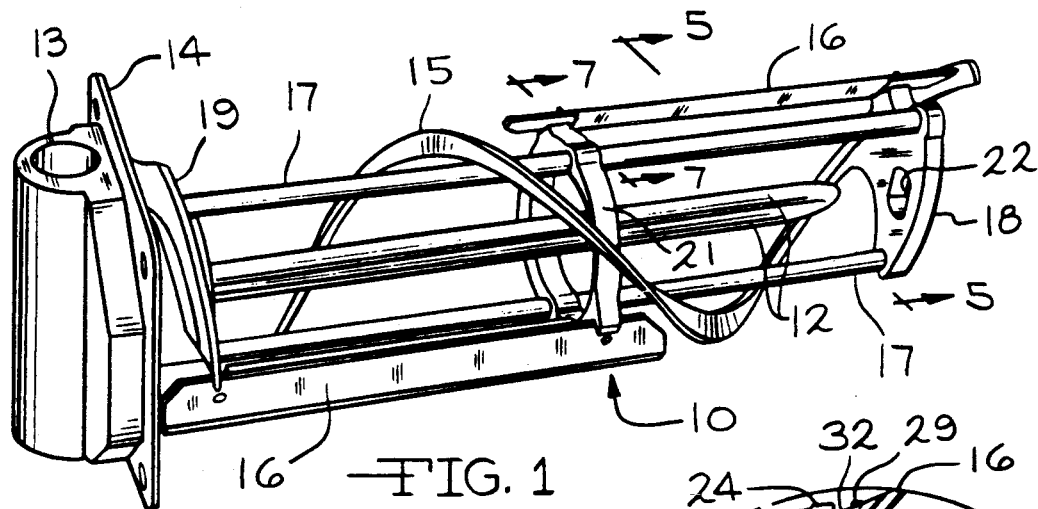
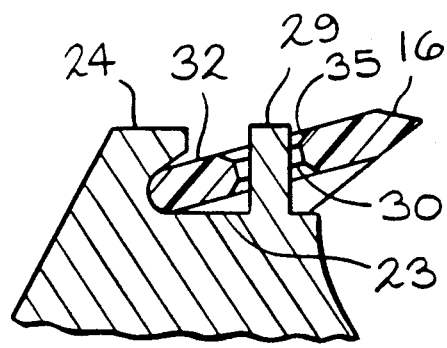
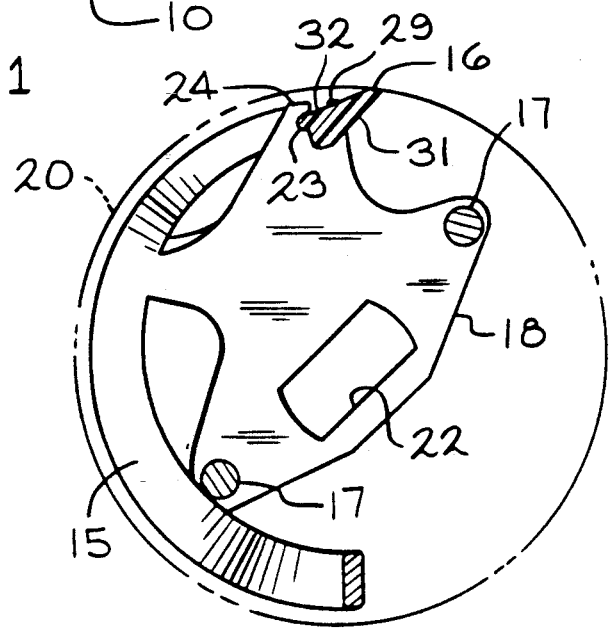
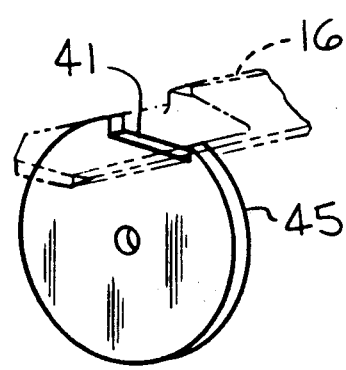
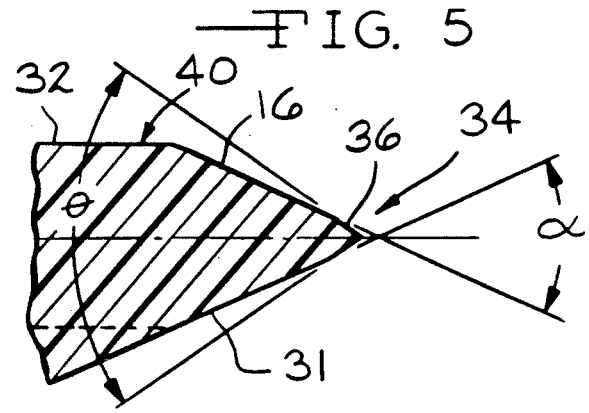

ROTARY MIXER WITH RESINOUS SCRAPER BLADES

This invention relates to scraper blades for rotary mixers in cylindrical freezers for producing soft frozen foods such as ice cream and frozen yogurt.

BACKGROUND

In commercial equipment for producing confectionery frozen foods such as ice cream and frozen yogurt, the recipe materials for the desired frozen food are introduced into a cylindrical chamber and then thoroughly mixed to provide a uniform consistent edible, usually creamy mass. The mixing is accomplished by a longitudinal mixer rotor commonly called a beater installed in the cylinder, such mixer rotor having a single longitudinal helical beating or mixing blade extending in helical relation about the axis of rotation of the empty outer periphery of the beater. In addition to the helical blade, the beater has straight longitudinal metal scraper blades having a length about half the length of the mixing rotor itself, usually two in number supported at diametrically opposite sides of the rotary mixer and at opposite ends of the rotor. The blades extend parallel to the rotor axis of rotation with their sharp scraping edge moveable to the radially outer-most position where they can make contact with material accumulated on the interior wall of the longitudinal cylinder thereby causing them to effectively remove frozen material from the interior wall of the freezer surface as the beater is rotated.

To effect the scraping or wiping of the cylinder wall by the scraper blades, they are each pivotally supported upon a pair of spaced mounting pins or prongs projecting from the rotor in a direction generally away from the rotor axis of rotation for extension through mounting apertures provided at opposite ends of the blade. The support prongs are slightly arced and the apertures are large enough such that the blades are loosely mounted thereon to permit them to move about their back edge with an arced movement radially outwardly under centrifugal force as the mixer is rotated, whereupon the blades extend themselves to their outermost reach as permitted by the dimensions of the interior surface of the cylindrical chamber.

In other words the scraper blades are each mounted so that their scraper edge is moveable laterally inward to a degree such as to provide clearance for easy installation of the rotor within the cylinder. The scraper edge is moveable outwardly from its inward position under the influence of centrifical force and by the push on the blade by material being mixed. The scraper edge thus moves toward the interior surface of the cylinder to effect removal of the frozen material coated thereon.

A significant problem confronted in conventional equipment of this type is that the blades of metal, usually of surgical stainless steel, frequently make direct contact with the metallic interior surface of the cylinder while scraping the material therefrom. This results in a wearing away of both the interior metallic surface of the freezer and the thin sharp edge of the metallic scraper blade. With such wear, particles of metal become mixed into the frozen food produced by the freezer. Although visually imperceptible, the particles are undesirably present as metallic contaminants in the foods produced by such equipment for consumption.

Additionally as surfaces of both the blade and the freezer interior wear away, the wear is frequently nonuniform thus preventing uniform and complete scraping of the frozen material from the chamber sides. Scoring of the interior surface thus at times results necessitating costly repairs to bring the freezer up to at least norm in operation according to design specifications.

In view of the foregoing difficulties, it is an object of the invention to reduce or eliminate the presence of metal particles in the frozen confectionery product produced by such machines by eliminating metal to metal contact between the scraper blades and the interior wall of the freezer chamber.

It is another object of the invention to provide a mixer scraper blade shaped such that the usual tendencies toward buildup of material on the blade itself are minimized which operates quietly with reduced tendency to score the metallic interior surface of the freezer cylinder and at the same time being more effective in scraping frozen material from the chamber sides.

Still further it is another object of the invention to provide a scraper blade of resinous material having a longer operational life than conventional metal blades and also being of material which will minimize bacterial growth by reason of the greater ease of cleaning such blades.

BRIEF DESCRIPTION OF THE INVENTION

The scraper blade of the present invention is designed with a cross sectional shape such that the leading face extends from the sharp scraping edge at an angle which facilitates removal therefrom or peel off of the material scraped from the freezer wall, with little or no tendency toward hangup on the face of the blade. The blade can be made of a resin material selected to have a low coefficient of friction, or in other words, a slippery character, to thereby further facilitate removal of material from the blade. The resin blade is further advantageous because of its lower thermal conductivity which still further reduces tendencies toward hangup of material which might otherwise freeze onto conventional metal blades. With the blades being provided a face having a more effective peel off angle, they are designed with a thicker base than the conventional uniform thickness metal blades, thereby providing a strength in each blade against flex which permits it to be made of resinous material. A scraping face having an included angle in the range of 30-70 degrees to the back face of the blade is found quite advantageous. A face angle of 47 degrees to the back of the blade, in particular, has been found to function well in preventing hangups of material on the blade and in providing a long wearing blade.

Features of the invention lie in the blades providing a quieter operation and the fact that they are not subject to being dented when they fall onto hard surfaces. The blades also lend themselves to greater ease of handling compared to heavier sharp metal blades which can injure operators.

The blades of the invention have been made of low friction resinous material such as an acetal resin and more particularly a material such as that sold by the DuPont Corporation under the trademark DELRON 500 acetal. Scraper blades of such material are smooth and less microporous than metals and have a characteristic slipperiness which reduces the tendency toward build-up of frozen milkstone material thereon. In addition, the shaping of the blade is such that the materials wiped or scraped from the interior surface of the freezer will slide over the base surfaces of the blade, practically eliminating tendencies toward accumulation of frozen material thereon.

The blades in being made of resin can also be more readily provided with rounded edges and corners than similarly designed blades made of metal, thereby further reducing tendencies toward objectionable milkstone particle buildup thereon.

In addition the fact that the blades are made of resinous material permits unique shaping of each with a thick body section for strength against flex and breakage and an angular scrape off surface so that material scraped from the freezer wall will slide over the under surface of the blade at an angle and blend toward the center of the mixer, thereby practically eliminating tendencies for the frozen material to accumulate on the blade itself.

The fact that the blades of the invention are not of metal but rather are made of high tensile strength plastic material with a low coefficient of friction, the chance of metal particles getting into the confectionery product by reason of blade contact is eliminated.

Tests have shown that blades made of resinous material according to the invention also have a longer wear life and are much quieter in operation since no clacking of metal to metal occurs.

It has been found that a wear of resinous blades of only 0.002" occurs in six weeks rather than 0.002" to 0.010" of wear experienced in six weeks with surgical stainless steel blades. Further, no scoring of the mixing chamber occurs because of the softer properties of the resinous blades compared to the metallic chamber walls which they contact. It has been found that the normal wear of surgical stainless steel blades used in such freezers is such that they require replacement approximately every six months at an appreciable annual cost which is considerably reduced by the present invention.

Because it is a function of the scraper blades to remove any frozen product from the side wall of the freezing cylinder, keeping the mix smooth and palatable, it is a requirement that the blades be fairly sharp. Yet not so sharp that the contact with the interior wall of the cylinder will effect its immediate dulling. In contrast it is found that the resinous blades will allow a degree of scraping of the wall and can be brought closer to the metallic surface of the cylinder without fear of scoring the cylinder surface, which when it occurs involves considerable cost and repair of the blades and the interior of the freezing chamber.

A principal feature of the invention is that the particles of metal will not appear in the confectionery product produced, such as ice cream, when the resinous blades are used. This feature has proven extremely important and is supplemented by the longer wear experienced in the use of the resinous blades.

Thus important features of the invention are the longer lasting blade life; a blade that does not release metals into the product which is to be digested by the consumer; a blade that will not score the metal wall of the freezing chamber; a blade that functions to make the product more palatable in being more creamy; and a blade that can be used with sanitary concentrates, including milkstone solvents, without having an affect on the product produced.

BRIEF DESCRIPTION OF THE DRAWINGS

FIG. 1 is a perspective view of a mixer rotor of the present invention shown in assembly with its associated dispenser head at one end and a stationary central baffle extending therefrom;

FIG. 5 is a cross-sectional view of the mixer rotor of FIG. 2 taken on line 5—5 showing the scraper blade of FIG. 3 in cross-section in its outwardly extended position in contact with a freezer cylinder wall illustrated by a phantom line;

FIG. 6 is a partial view of the scraping blade of the invention showing in greater detail the sharper edge of the blade of FIG. 3;

FIG. 7 is an enlarged cross-sectional view of the scraper blade of FIG. 3 shown in its supported position on the rotor as taken on line 7—7 of FIG. 1; and FIG. 8 is perspective view of a circular gauge for checking wear of a scraper blade illustrated in dotted lines.

DETAILED DESCRIPTION

Figure 2:
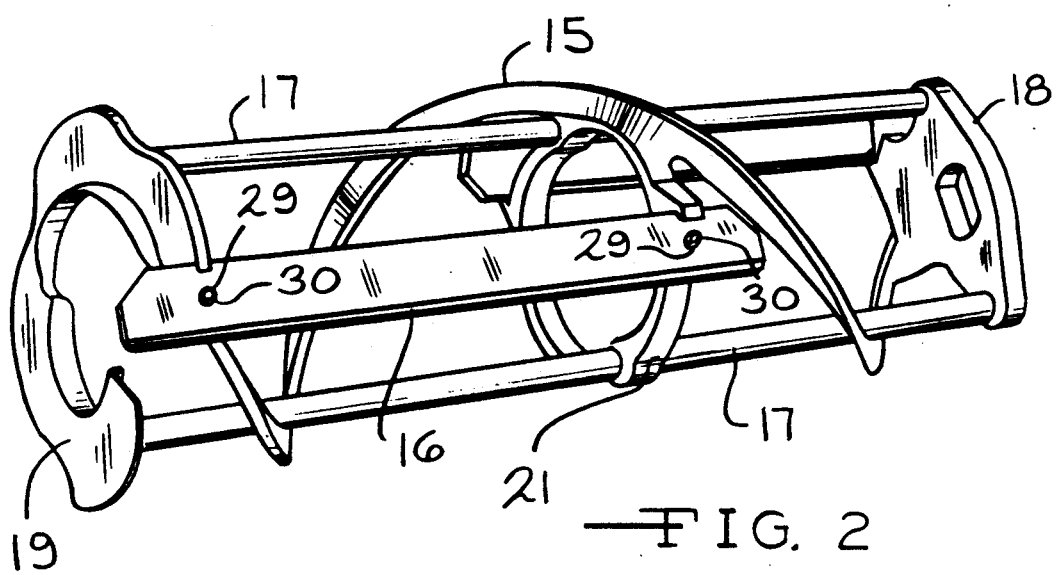
FIG. 2 is a perspective view of the mixer rotor of FIG. 1 showing in more detail the diametrically oppositely positioned scraper blades located at opposite ends of the rotor.

The present invention relates to a rotary mixer assembly for freezer machines for producing ice cream, frozen yogurt and like confectionery foods in which the rotary mixer is assembled in a cylindrical freezer chamber to which ingredients for making the desired frozen confectionery food is supplied, then thoroughly mixed and released through a dispensing head at one end. FIG. 1 shows the mixer rotor 10 and the interior stationary baffle 12 extending in cantilever fashion from the mounting plate 14 by which the assembly is supported over the end of the cylindrical freezer chamber into which the assembly is inserted. Once in place in the freezer chamber the assembly is not visible except for the dispensing head 13 from which frozen mixed food is dispensed from a bottom outlet to which the mixed materials are fed under the pressure influence provided by the helical blade as the rotor is rotated usually in a clockwise direction.

The central baffle 12 which is a stationary fixed U-shaped member extending from the front bearing plate 14 over a major portion of the length of the rotor and assists in the mixing by providing a stationary resistance to flow as the rotor with its peripheral helical beater 15 acts to circulate the material and move it lengthwise toward the dispensing head under the action of the helical blade 15. The rotor 10 is held in assembled relation by the supporting rods 17. The rotor is supported within the freezer cylinder between the drive shaft and the bearing plate 19 which makes rotational contact with an inside bearing surface of the front mounting plate 14 which covers the freezer cylinder.

The scraper blades 16 of the beater rotor have lengths such that they extend for at least half the length of the rotor on diametrically opposite sides and at opposite ends of the rotor. Each extends from an end of the rotor to the central mounting support ring 21. More specifically, the back scraper blade 16 is mounted on and extends from the drive plate 18 at the rear of the rotor to the central mounting ring 21 while the front scraper blade 16 has one end mounted on and extends from the front end bearing plate 19 to the central mounting ring 21 but on the diametrically opposite side of the rotor from that of the rear scraper blade. The blades thus in a sense overlap in length and in combination extend throughout the length of the freezer cylinder. The rotor assembly is driven rotationally by a motor drive (not shown) having a rectangular drive shaft which fits snugly into a rectangular drive shaft aperture 22 in the drive plate 18 in alignment with the rotor axis of rotation.

FIG. 2 shows the beater rotor alone without the internal baffle member, illustrating in greater detail how the blades 16 are each held on the rotor by a pair of prong projections 29 which engage opposite ends of the blade. The rotor provides a narrow blade support region 23 for each blade end. A pair of such support regions 23 are provided on diametrically opposite sides of the central mounting ring 21. A corresponding support region for the front scraper blade is provided in an extension from the front bearing plate 19 leading into the helical mixing blade 15. A similar support region 23 is provided for the rear scraper blade 16 in the drive plate 18. Such a support region 23 is illustrated more clearly in FIG. 7 which shows the ring 21 with a flat end portion 33 of the blade backed by a recess formed by an overhanging projection 24 into which the back edge of the scraper blade interlocks loosely.

Figure 3:
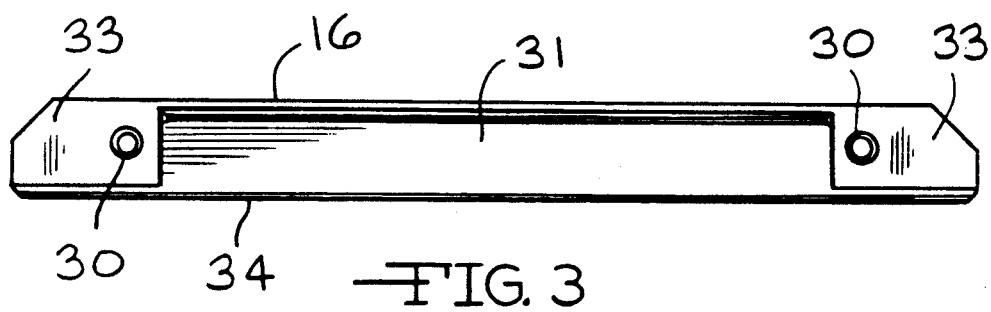
FIG. 3 is a bottom planned view of a scraper blade embodying the principles of the invention.
Figure 4:
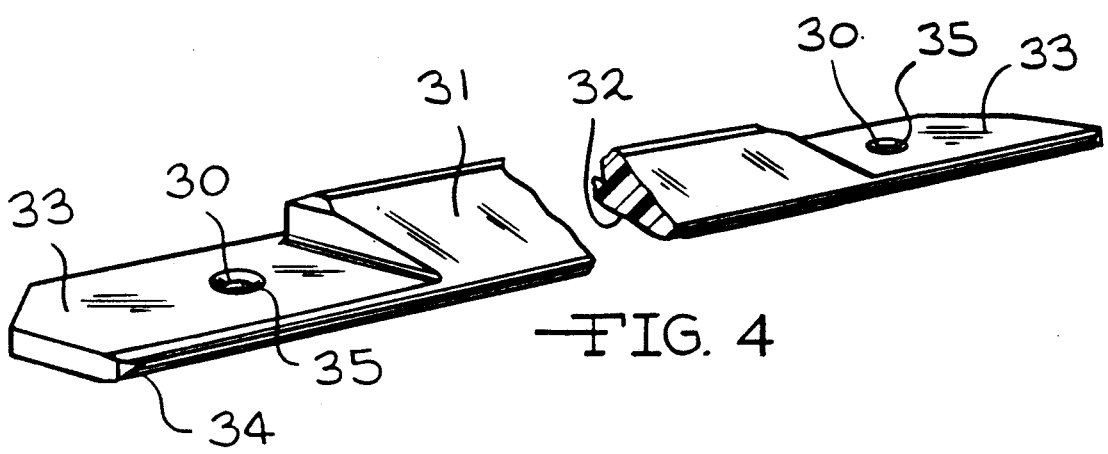
FIG. 4 is an enlarged broken apart perspective view in cross-section of the blade of FIG. 3.

FIG. 3 shows the underside 31 of a blade 16 in plan view. The angular relation of the undersurface 31 of the blade relative to the flat upper side 32 is shown with greater clarity in the broken away generally triangular cross sectional view of the blade in FIG. 4. The back edge of the blade as seen in cross section is relatively thick compared to the sharp scraping front edge. The blade has two spaced mounting apertures 30, each provided with beveled edges 35 to reduce potentials for milkstone buildup or other buildup of material. Apertures which are positioned to be engaged by the holding prongs 29 are each placed in an end region of the blade having parallel upper and lower surfaces to facilitate mounting of the blade on the rotor in conventional manner corresponding to the manner of mounting conventional metal blades which have parallel opposite surfaces throughout their length.

As shown in FIG. 1 and FIG. 5 which is a sectional view on line 5—5 of FIG. 1 omitting the baffle 12, end portions 33 of the blades 16 are each mounted on such a support region 23 with a prong projection 29 extending upward through a respective blade aperture 30 as may be seen more clearly in FIG. 7. The blades are each thus held in position on the rotor by prongs 29, the apertures 30 are slightly larger than the diameter of the prongs thus resulting in the blades being held in position loosely and permitting them to be tilted at an angle upwardly and outwardly about their back edge within the overhang 24 thus causing the sharper edge 34 of the blade to make contact with the interior wall of the cylinder 20 as illustrated in FIG. 5.

As the beater rotor 10 is rotated clockwise the blades 16 tend to move outwardly under the influence of centrifugal force but in addition are pushed by the material being mixed which causes their sharper edges 34 to make engagement with the interior wall 20 of the cylinder where they act to scrape off or wipe off materials accumulated thereon during the mixing cycle.

FIG. 6 shows the sharper end 34 of the blade 16 in greater detail with a flat top surface 32 and the flat under surface 31 angled away therefrom so that the under surface can assist in conveying material removed from the wall more toward the center of the cylinder. In this way the material coating or otherwise accumulated on the cylinder wall is in a sense peeled away by the blade, which action is assisted by the angle of the under surface 31. The upper surface of the sharp pointed region 34 of the blade thus wears away progressively over a prolonged period, such as 6 months. An extremely fine discontinuous score line 40 can be provided parallel to the sharp point in a distance from the edge corresponding to the maximum wear permissible. Thus when the wear region extends to the score line a visual indication is provided that the blade is ready for replacement. This occurs in practice when the blade has worn away approximately 1/16 of an inch of its width. A gauge 45 can also be provided having a gap or groove 41 in its edge of width corresponding to the minimum width dimension to which a blade can be worn for effective use. Thus the gauge is in a sense a go-no-go gauge such that when a blade is worn sufficiently to fit within the groove, it is ready to be replaced. Either or both wear guide techniques can be utilized to indicate when a blade must be replaced because of excessive wear however the gauge measurement is preferred.

An included angle of from 30 to 60 degrees between the upper surface 32 and the under surface 31 has been found highly effective in removing material from the inner wall of the cylinder. As indicated, an included angle of 47 degrees has been found to be particularly effective for removal of most materials. This angle is represented by the symbol alpha ($\alpha$) in the magnified representation of the edge 34 of FIG. 6 while a still sharper included angle theta ($\theta$) for the very tip 36 of the sharp edge 34 is in the range of 55 to 75 degrees and 68 degrees has been found particularly effective.

In view of the foregoing description it is submitted that there has been described herein a new and improved scraper blade for frozen confectionery machines. While the embodiment described herein is preferred, it will be understood that variations and modifications may be made therein by those having skills in the art, and it is intended to cover in the appended claims all such variations and modifications as fall within the true spirit and scope of the invention.

What is claimed is:

1. A freezer machine for producing ice cream, frozen yogurt and like confectionery foods comprising in combination a freezer having a cylindrical mixing and freezing chamber, a longitudinal mixing rotor of diameter closely fitting within said cylindrical chamber for moving and mixing recipe ingredients introduced into said chamber for freezing and a drive arranged to rotate said rotor in a single direction, said rotor comprising a helical mixing blade extending in fixed relation circumferentially about said rotor, said combination including a pair of scraper blades made of resinous material mounted at diametrically opposite sides and at opposite ends of said rotor, extending parallel to the axis of rotation of said rotor, said blades being mounted with their scraper edges in close spaced proximity to the wall of said freezer chamber, the leading face of each of said blades facing the direction of rotation of said rotor being angularly oriented leaning toward the direction of rotor rotation such that upon rotation of said rotor centrifugal force and the material being mixed in said freezer chamber move the scraper edge of each of said blades radially outwardly toward said freezer wall for removal of accumulated frozen material on said wall said scraper blades each having a main body portion between two mounting ends, said main body portion being thicker at its lateral side opposite the scraping edge thereby imparting a generally triangular cross-sectional shape thereto said mounting ends each comprising a relatively short flat portion of said blade having parallel opposed faces.

2. A scraper blade as set forth in claim 1 in which the angle included between the leading face of said scraper blade which engages the material being mixed and the trailing surface of the blade extending from said scraper edge is within the range of 30 to 70 degrees.

3. A scraper blade as set forth in the machine of claim 2 in which the angle included between said leading face of the scraper blade and the trailing surface of the blade is 47 degrees.

4. A scraper blade as set forth in claim 1 in which each end of said blade has a mounting aperture extending therethrough for receipt of a mounting prong on said rotor extending therethrough.

5. A freezer machine for producing ice cream, frozen yogurt and like confectionery foods comprising in combination
 a cylindrical freezing chamber,
 a longitudinal mixer rotor of diameter closely fitting within said cylindrical chamber,
 a means for driving said rotor rotationally in a single direction and
 a pair of scraper blades each having a length at least half the length of said rotor,
 said scraper blades being made of resinous material,
 said scraper blades being mounted at diametrically opposite sides and at opposite ends of said rotor,
 said scraper blades each being pivotally mounted on said rotor in parallel relation with the axis of rotation of said rotor and each having a scraper edge in closely spaced proximity to the wall of said chamber,
 the leading face of each of said blades facing the direction of rotation of said rotor being oriented leaning toward the direction of rotation such that the material mixed in said freezer chamber upon rotation of said rotor pushes the scraper edge of each of said blades laterally outward toward said freezer wall for removal of accumulated material on said wall said scraper blades each having a main body portion between two mounting ends, said main body portion being thicker at its side opposite the scraper edge to impart a generally triangular cross sectional shape thereto, and
 said mounting ends each comprising a relatively short flat portion of said blade having parallel opposed faces.

6. A scraper blade as set forth in the machine of claim 5 in which the resinous material is an acetal resin.

7. A freezer machine for producing ice cream, frozen yogurt and like foods comprising in combination
 a cylindrical freezer chamber and
 a longitudinal rotor for mixing ingredients introduced in said chamber for freezing,
 an inlet for supply of ingredients into said chamber,
 an outlet for removal of frozen product from said chamber,
 said rotor comprising a helical blade extending about the periphery thereof and
 a pair of scraper blades,
 said scraper blades being located at diametrically opposite sides of said rotor at opposite ends thereof,
 said blades each extending at least to the center of the length of said rotor,
 each of said blades having a sharp edge and between its ends being shaped thicker at the edge opposite said sharp edge,
 said blades each having flat end portions of short length for engagement by support means on said rotor,
 said support means comprising a pair of mounting prongs on said rotor for each of said blades,
 each of said pair of mounting prongs being spaced on said rotor for engagement with apertures in said end portions of the blade which they are to engage,
 each of said blades being pivotally mounted in loosely held relation on said prongs to permit movement of its sharp edge into contact with the interior wall of said cylindrical chamber for removal of accumulated material thereon during rotation of said rotor,
 each of said blades having its upper surface generally parallel to its flat end portions and an undersurface angled to said upper surface at an angle selected to facilitate passage of material thereover which material otherwise would tend to collect thereon during rotation of said mixing rotor.

8. A scraper blade as set forth in the machine of claim 7 in which the angle included between the leading under surface of said blade and the trailing upper surface of the blade extending from said scraper edge is within the range of 30 to 70 degrees.

9. A scraper blade as set forth in claim 8 in which the angle included between said leading under face and said trailing under surface of the blade is 47 degrees.

* * * * *